US011272222B2

(12) United States Patent
Zeng et al.

(10) Patent No.: US 11,272,222 B2
(45) Date of Patent: Mar. 8, 2022

(54) BIT RATE CONTROL METHOD AND VIDEO PROCESSING DEVICE

(71) Applicant: REALTEK SEMICONDUCTOR CORPORATION, Hsinchu (TW)

(72) Inventors: Wei-Min Zeng, Milpitas, CA (US); Chi-Wang Chai, Cupertino, CA (US); Qing-Xi He, Suzhou (CN); Xiao-Hua Xi, Suzhou (CN); Rong Zhang, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 13 days.

(21) Appl. No.: 17/141,253

(22) Filed: Jan. 5, 2021

(65) Prior Publication Data
US 2021/0306677 A1    Sep. 30, 2021

(30) Foreign Application Priority Data

Mar. 26, 2020   (CN) .......................... 202010224026.X (51) Int. Cl.
*H04N 19/96*    (2014.01)
*H04N 19/184*   (2014.01)
*H04N 19/176*   (2014.01)

(52) U.S. Cl.
CPC .......... *H04N 19/96* (2014.11); *H04N 19/176* (2014.11); *H04N 19/184* (2014.11)

(58) Field of Classification Search
CPC ..... H04N 19/96; H04N 19/176; H04N 19/184
See application file for complete search history.

(56) References Cited

U.S. PATENT DOCUMENTS

| 7,965,768 B2 * | 6/2011 | Ito ........................ H04N 19/152 375/240.03 |
| 2005/0169370 A1 * | 8/2005 | Lee ...................... H04N 19/124 375/240.03 |

(Continued)

FOREIGN PATENT DOCUMENTS

TW    201737707 A    10/2017

OTHER PUBLICATIONS

B. Li, H. Li, L. Li, and J. Zhang, ("Rate control by R-lambda model for HEVC," document JCTVC-K0103, Joint Collaborative Team on Video Coding (JCT-VC) of ITU-T SG 16 WP 3 and ISO/IEC, 11th Meeting: Shanghai, China, Oct. 10-19, 2012) (Year: 2012).*

(Continued)

*Primary Examiner* — Dave Czekaj
*Assistant Examiner* — Berteau Joisil
(74) *Attorney, Agent, or Firm* — WPAT, PC (57) ABSTRACT

A bit rate control method includes the following operations: receiving a first target bit of a video to be coded; determining a second target bit for first coding tree units (CTUs) in CTUs of the video according to the first target bit; determining a fourth target bit of at least one fourth CTU in the CTUs according to an actual bit of at least one second CTU in the CTUs and a third target bit of at least one third CTU in the CTUs, in which the at least one second CTU is completely coded, the at least one third CTU is not completely coded, and a coding of the at least one fourth CTU is not started; and sequentially adjusting at least one coding parameter for coding the video according to the second target bit, the third target bit, and the fourth target bit.

14 Claims, 8 Drawing Sheets

(56) References Cited

U.S. PATENT DOCUMENTS

2011/0069754 A1* 3/2011 Wang .................. H04N 19/172
                                                                   375/240.03
2017/0295368 A1* 10/2017 Teng .................... H04N 19/172
2020/0128253 A1* 4/2020 Zhou ...................... H04N 19/85

OTHER PUBLICATIONS

OA letter of the counterpart TW application (appl. No. 109111998) dated Apr. 16, 2021. Summary of the OA letter: 1 Claims 1, 5, and 7 are rejected as allegedly being unpatentable over first cited referecnce (TW 201737707 A, also published as US 2017/0295368A1) in view of second circuited reference (US 2011/0069754 A1). 2. Claims 2-4, 6, and 8-10 are allowable.
B. Li, H. Li, L. Li, and J. Zhang, "Rate control by R-lambda model for HEVC," document JCTVC-K0103, Joint Collaborative Team on Video Coding (JCT-VC) of ITU-T SG 16 WP 3 and ISO/IEC, 11th Meeting: Shanghai, China, Oct. 10-19, 2012.

* cited by examiner

BIT RATE CONTROL METHOD AND VIDEO PROCESSING DEVICE

BACKGROUND OF THE INVENTION

1. Field of the Invention

The present disclosure relates to a video processing device. More particularly, the present disclosure relates to a video processing device that codes coding tree unit levels of a video and a bit rate control method thereof.

2. Description of Related Art

By adjusting coding parameters of a video coder to control the bit rate of the video, the outputted video stream is able to meet the finite and time-varying bandwidth limit. Recently, a video compression standard of high efficiency video coding (HEVC) is ratified to improve video quality and high data compression rate. However, in current approaches, all smallest blocks able to be coded are required to be processed to adjust coding parameters accordingly. As a result, the computational complexity is too high, resulting in a difficulty of hardware implementation. Moreover, as wire delays may exist in hardware, actual coding progress may require longer processing time.

SUMMARY OF THE INVENTION

In some embodiments, a bit rate control method includes the following operations: receiving a first target bit of a video to be coded; determining a second target bit for a plurality of first coding tree units in a plurality of coding tree units of the video according to the first target bit; determining a fourth target bit of at least one fourth coding tree unit in the plurality of coding tree units according to an actual bit of at least one second coding tree unit in the plurality of coding tree units and a third target bit of at least one third coding tree unit in the plurality of coding tree units, wherein the at least one second coding tree unit is completely coded, the at least one third coding tree unit is not completely coded, and a coding of the at least one fourth coding tree unit is not started; and sequentially adjusting at least one coding parameter for coding the video according to the second target bit, the third target bit, and the fourth target bit.

In some embodiments, a video processing device includes a memory circuit and a processor circuit. The memory circuit is configured to store at least one program code. The processor circuit is configured to execute the at least one program code, in order to: receive a first target bit of a video to be coded; determine a second target bit for a plurality of first coding tree units in a plurality of coding tree units of the video according to the first target bit; determine a fourth target bit of at least one fourth coding tree unit in the plurality of coding tree units according to an actual bit of at least one second coding tree unit in the plurality of coding tree units and a third target bit of at least one third coding tree unit in the plurality of coding tree units, wherein the at least one second coding tree unit is not completely coded, the at least one third coding tree unit is completely coded, and a coding of the at least one fourth coding tree unit is not started; and sequentially adjust at least one coding parameter for coding the video according to the second target bit, the third target bit, and the fourth target bit.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Following descriptions include various technical terminologies about video coding. Person skilled in the art should understand relevancy between these technical terminologies and the video coding and/or related configurations.

Figure 1:
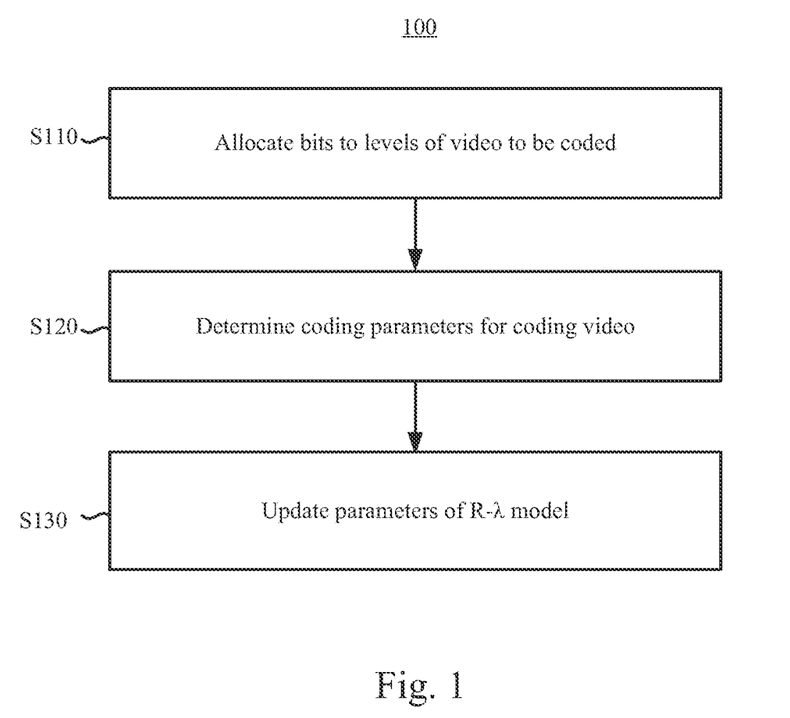
FIG. 1 is a flow chart of a bit rate control method according to some embodiments of the present disclosure.

FIG. 1 is a flow chart of a bit rate control method 100 according to some embodiments of the present disclosure. In some embodiments, the bit rate control method 100 is a bit rate control method for coding video based on an R-λ model. In some embodiments, the concept of the R-λ model can be understood with reference to the following related document: "B. Li, H. Li, L. Li, and J. Zhang, "Rate control by R-lambda model for HEVC," document JCTVC-K0103, Joint Collaborative Team on Video Coding (JCT-VC) of ITU-T SG 16 WP 3 and ISO/IEC, 11th Meeting: Shanghai, China, 10-19 Oct. 2012." The following paragraphs will provide a simplified concept of the R-λ model, and details of the R-λ model can be understood with reference to the above document.

In the R-λ model, it is assumed that a bit rate R of a video to be coded and a Lagrange multiplier λ are satisfied with the following equation:

$$R = \alpha \cdot \lambda^\beta \qquad (1)$$

Where α and β are parameters associated with video coding.

Based on the equation (1), the bit rate control method 100 includes multiple operations. In operation S110, bits are allocated to levels of the video to be coded. In some embodiments, the levels, in a top-to-bottom order, may be a group of pictures (GOP) level, a picture level, and a coding tree unit (CTU) level. The GOP level may be successive pictures in one frame of the video. The picture level may be one of the successive pictures. The CTU level is a block processed by a processing unit in one picture. In some embodiments, the CTU level is a minimum block of a single picture that is able to be processed by a processing unit. The bit rate control of the levels is described in the following paragraphs.

Assumed that a target bit (or a target bit rate) of the video is $R_{tar}$ and a frame rate of the video is f, an average bit rate $P_{PicAvg}$ per frame of the video can be derived with the following equation (2):

$$R_{PicAvg} = R_{tar}/f \qquad (2)$$

If a number of frame(s) that are coded is $N_{coded}$ and the bit cost on those frames is $R_{coded}$, a target bit $T_{GOP}$ allocated in the current GOP level is determined as follows:

$$T_{AvgPic} = \frac{R_{PicAvg} \cdot (N_{coded} + SW) - R_{coded}}{SW} \qquad (3)$$

$$T_{GOP} = T_{AvgPic} \cdot N_{GOP} \qquad (4)$$

SW is a size of a smooth window which makes the bit rate change smoother. $T_{AvgPic}$ is a number of bits cost by the smooth widow per picture. $N_{GOP}$ is a number of pictures in the current GOP level.

Assumed that a number of the coded bit(s) (i.e., bit cost) in the current GOP level is $Coded_{GOP}$ and that $\omega_{CurrPic}$ is the weight of each picture in the current GOP level, a target bit $T_{CurrPic}$ of the current coded picture can be determined as follows:

$$T_{CurrPic} = \frac{T_{GOP} - Coded_{GOP}}{\sum\limits_{NotCodedPictures} \omega_i} \cdot \omega_{CurrPic} \qquad (5)$$

The denominator of the equation (5) is a sum of weights of pictures that are not coded, in which the determination of the weight $\omega_{CurrPic}$ can be understood with reference to the above related document.

When the control of the bit rate of the CTU level is enabled, a target bit $T_{CurrCTU}$ of each CTU is determined as follows:

$$T_{CurrCTU} = \frac{T_{CurrPic} - Bit_{header} - Coded_{Pic}}{\sum\limits_{NotCodedCTUs} \omega_i} \cdot \omega_{CurrCTU} \qquad (6)$$

A denominator of the equation (6) is a sum of weights of CTUs that are not coded, and $Bit_{header}$ is a number of estimated bits of all headers in the pictures. The above headers may include a slice header, a video parameter set (VPS), a sequence parameter set (SPS), a picture parameter set (PPS), etc. $Bit_{header}$ may be estimated according to actual bits of the headers in the coded pictures. $Coded_{Pic}$ is a number of coded bits (i.e., bit cost) in the video (or picture). The determination of a weight $\omega_{CurrCTU}$ of the CTU can be understood with reference to the above related document. In some embodiments, the weight $\omega_{CurrCTU}$ of the CTU may be estimated according to prediction error(s) in the previously coded picture(s). The prediction error(s) may be determined with a calculation of mean absolute difference (MAD). In some embodiments, when an image texture or a color correspond to the CTU is more complicated, the weight $\omega_{CurrCTU}$ of the CTU is higher.

In operation S120, coding parameters for coding video are determined. For example, in order to reach a bit rate R of the video, it is required to determine a corresponding Lagrange multiplier λ. On condition that the bit rate R is known to be the target bit $R_{tar}$, it is able to determine an estimated Lagrange multiplier $\lambda_{pred}$ with the equation (1) as follows:

$$\lambda_{pred} = \alpha \cdot \left(\frac{T}{w \cdot h}\right)^\beta \qquad (7)$$

T is a target bit $T_{CurrPic}$ of the picture (or is a target bit $T_{CurrCTU}$ of the CTU), w and h are the width and the height of the current picture (or the current CTU) respectively. In some embodiments, with certain number of tests, it is able to derive that a quantization parameter QP can be expressed as the following equation (8):

$$QP = 4.2005 \ln \lambda + 13.7122 \qquad (8)$$

The quantization parameter QP is the coding parameter for coding video and is to indicate the compression level of the video. If the value of the quantization parameter QP is lower, the bit rate of the video is higher, and the quality of the pictures is better.

Figure 2:
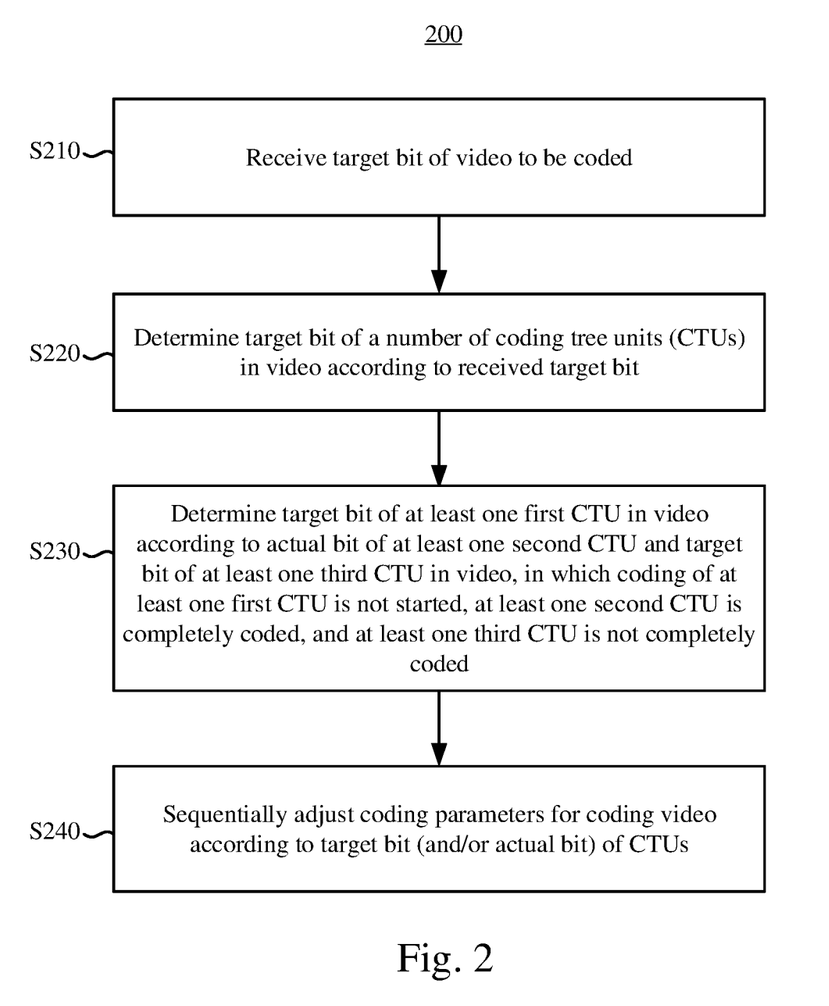
FIG. 2 is a flow chart of a bit rate control method for coding video according to some embodiments of the present disclosure.

The values in the above equation (8) are given for illustrative purposes, and the present disclosure is not limited thereto. In some embodiments, when a bit rate control method 200 in FIG. 2 is performed, the equation (8) may be amended as:

$$QP = 4.8005 \ln \lambda + 13.7122$$

In operation S130, parameters of the R-λ model are updated. After one CTU is coded, a parameter α and a parameter β of the R-λ model can be updated according to actual coded bits and the Lagrange multiplier λ, in order to code the remaining video. For example, when actual bits $T_{actual}$ of the coded picture (or the coded CTU) are obtained, the updated Lagrange multiplier $\lambda$, the updated parameter $\alpha_{update}$, and the updated parameter $\beta_{update}$ can be determined with the following equations:

$$\lambda_{actual} = \alpha \cdot \left(\frac{T_{actual}}{w \cdot h}\right)^{\beta} \tag{9}$$

$$\alpha_{update} = \alpha + \delta_{\alpha} \cdot (\log\lambda_{pred} - \log\lambda_{actual}) \cdot \alpha \tag{10}$$

$$\beta_{update} = \beta + \delta_{\beta} \cdot (\log\lambda_{pred} - \log\lambda_{actual}) \cdot \left(\frac{T_{actual}}{w \cdot h}\right) \tag{11}$$

In some embodiments, an initial value of the parameter $\alpha$ may be 3.2003, and a range of the parameter $\alpha$ may be between 0.05 and 20. In some embodiments, an initial value of the parameter $\beta$ may be $-1.367$, and a range of the parameter $\beta$ may be between $-3$ and $-0.1$. In some embodiments, the parameter $\delta_{\alpha}$ and the parameter $\delta_{\beta}$ may be fixed values associated with the target bits $R_{tar}$. For example, the parameter $\delta_{\alpha}$ and the parameter $\delta_{\beta}$ may set according to a target bit per pixel in the picture of the video. If the target bit of each pixel is less than 0.03, the parameter $\delta_{\alpha}$ may be about 0.01 and the parameter $\delta_{\beta}$ may be 0.005. If the target bit of each pixel is greater than or equal to 0.03 and less than 0.08, the parameter $\delta_{\alpha}$ may be about 0.05 and the parameter $\delta_{\beta}$ may be 0.025. If the target bits of each pixel are greater than or equal to 0.03 and less than 0.2, the parameter $\delta_{\alpha}$ may be about 0.1 and the parameter $\delta_{\beta}$ may be 0.05. If the target bit of each pixel is greater than or equal to 0.02 and less than 0.5, the parameter $\delta_{\alpha}$ may be about 0.2 and the parameter $\delta_{\beta}$ may be 0.1. If the target bit of each pixel is greater than 0.5, the parameter $\delta_{\alpha}$ may be about 0.4 and the parameter $\delta_{\beta}$ may be about 0.2. The above values are given for illustrative purposes, and the present disclosure is not limited thereto.

FIG. 2 is a flow chart of a bit rate control method 200 for coding video according to some embodiments of the present disclosure. In some embodiments, operations of the bit rate control method 200 are able to reduce processing time, in order to reduce the complexity of hardware implementation. It should be understood that the bit rate control method 200 is an improvement of certain operations in the bit rate control method 100.

In operation S210, a target bit of the video to be coded is received. In operation S220, a target bit of a number of the CTUs in the video is determined together according to the received target bit. Partial details of operations S210 and S220 can be understood with reference to operation S110 in FIG. 1, and thus the repetitious descriptions are not given. In some embodiments, the target bit $R_{tar}$ of the video may be a value specified by a user. In some embodiments, the user may set the value of the target bit $R_{tar}$ according to the bandwidth requirement of the current environment and/or the requirement of the video resolution.

Figure 3A:
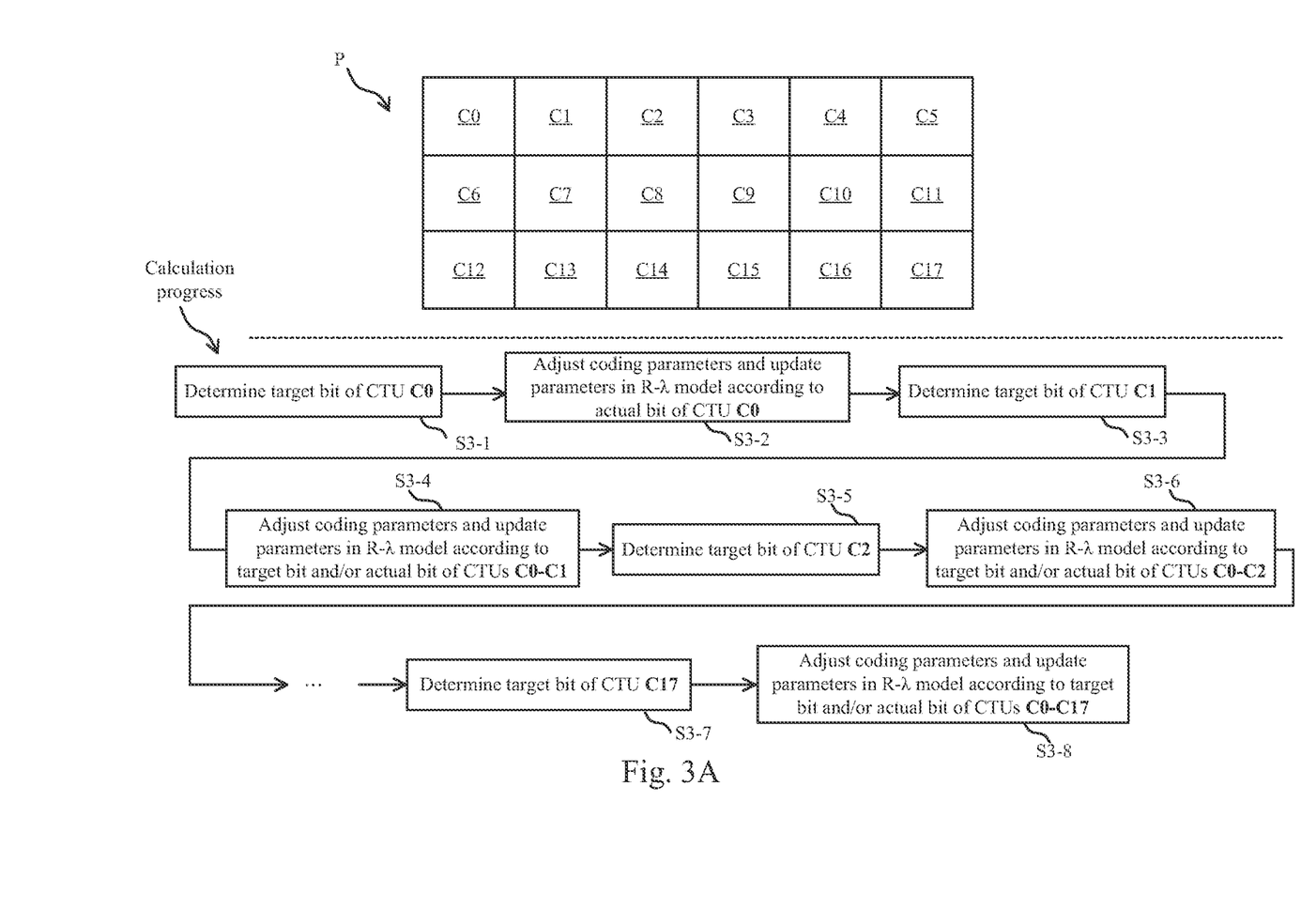
FIG. 3A is a schematic diagram illustrating a calculation progress of the target bit of the CTU with the R-$\lambda$ model of the related document.
Figure 3B:
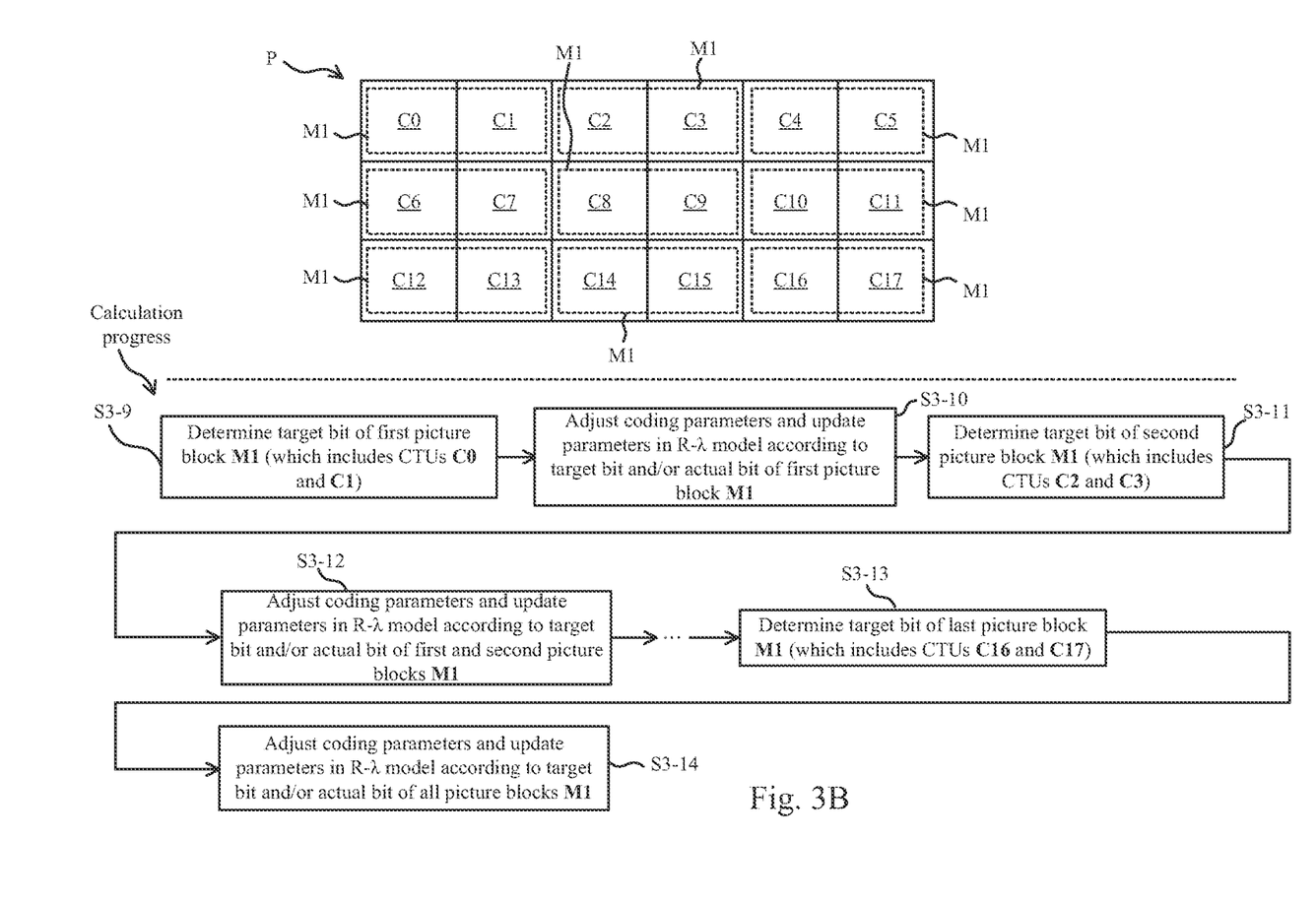
FIG. 3B is a schematic diagram illustrating certain operations in FIG. 2 according to some embodiments of the present disclosure.

In order to understand operation S220, reference is now made to FIG. 3A and FIG. 3B. FIG. 3A is a schematic diagram illustrating a calculation progress of the target bit of the CTU with the R-$\lambda$ model of the related document. FIG. 3B is a schematic diagram illustrating operations S220 and S240 in FIG. 2 according to some embodiments of the present disclosure. As shown in FIG. 3A, a picture P in the video can be divided into CTUs C0-C17. In the R-$\lambda$ model of the related document, the target bit of each CTU C0-C17 is sequentially determined by utilizing the equation (6) (i.e., steps S3-1, S3-3, S3-5, and S3-7). Whenever the target bit of each CTU C0-C17 is determined, the coding parameter(s) and parameter(s) in the R-$\lambda$ model are updated by utilizing the equations (7) to (11), the previous determined target bit(s) and/or actual bits (i.e., bit costs) of the coded CTU(s) (i.e., steps S3-2, S3-4, S3-6, and S3-8; which are equivalent to operations S120 and S130 in FIG. 1). As a result, such coding progress is wasteful of computing time.

Compared with FIG. 3A, in FIG. 3B, as the adjacent CTUs may have higher relevancy or have the similar picture texture, these CTUs are able to be considered as one picture block M1. The target bit of the CTUs in this picture block M1 can be determined with reference to the equation (6). For example, the adjacent CTUs C0 and C1 can be combined into one picture block M1, and a target bit $T_{mCTU}$ can be determined according to the following equation:

$$T_{mCTU} = \frac{T_{CurrPic} - Bit_{header} - Coded_{Pic}}{\sum\limits_{NotCodedCTUs} \omega_i} \cdot \omega_{mCTU} \tag{12}$$

The target bit $T_{mCTU}$ of the picture block M1 can be considered as the target bit for each of the CTUs C0 and C1. As a result, a number of calculations of target bits for the CTUs can be reduced. In some embodiments, the weight $\omega_{mCTU}$ is a sum of weights of the CTUs included in the picture block M1. For example, in view of the picture block M1, the weight $\omega_{mCTU}$ is a sum of the weight $\omega_{CurrCTU}$ of the CTU C0 and the weight $\omega_{CurrCTU}$ of the CTU C1. By this analogy, a target bit of each picture blocks M1 can be sequentially determined with the equation (12) (i.e., steps S3-9, S3-11, and S3-13; which correspond to operation S220 in FIG. 2). Whenever the target bit of one picture block M1 is determined, coding parameter(s) and/or parameter(s) in the R-$\lambda$ model can be sequentially adjusted and updated with the equations (7) to (11) according to the target bit(s) of the picture block(s) M1 that are previously determined and/or actual bit(s) (i.e., bit costs) of the coded CTU(s). Compared with FIG. 3A, such calculation is able to save the processing time of the coding progress, in order to lower the hardware requirements.

Figure 3C:
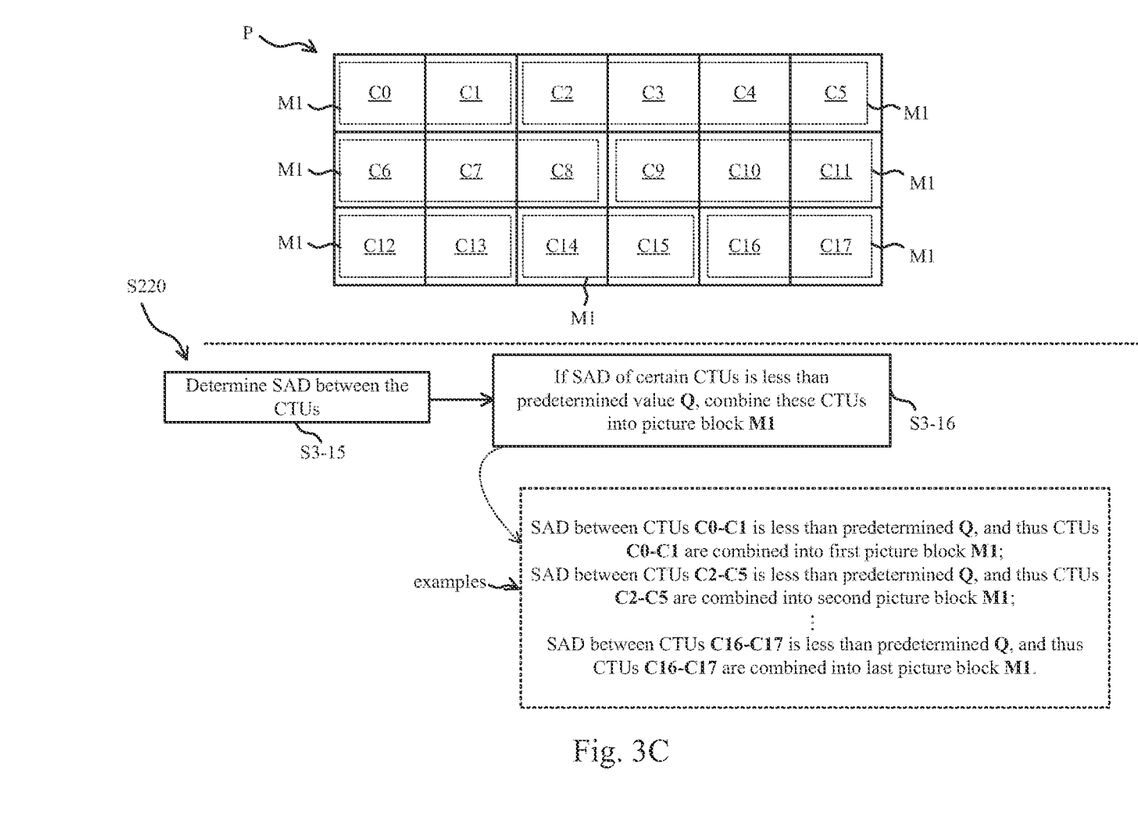
FIG. 3C is a schematic diagram of an operation in FIG. 2 according to some embodiments of the present disclosure.

The above examples are described with the picture block M1 including two CTUs for illustrative purposes, but the present disclosure is not limited thereto. In some embodiments, a number of CTUs included in the picture block M1 can be set within a predetermined range. In other words, the number of the CTUs included in the picture block M1 is variable. FIG. 3C is a schematic diagram of operation S220 in FIG. 2 according to some embodiments of the present disclosure. In this example, before the target bit $T_{mCTU}$ of the picture block M1 is determined, the relevancy between each CTU can be further analyzed, in order to determine the number of the CTUs in the picture block M1. As shown in FIG. 3C, a sum of absolute differences (SAD) between the CTUs C0-C17 are determined (i.e., step S3-15). If the SAD of some of the CTUs C0-C17 is less than a predetermined value Q, it indicates these CTUs have a high relevancy. As a result, these CTUs are able to be combined into one picture block M1 (i.e., step S3-16). As shown in FIG. 3C, for example, a SAD between the CTU C0 and the CTU C1 is less than the predetermined value Q, and thus the CTU C0 and the CTU C1 are combined into a first picture block M1. A SAD between the CTUs C2-C5 is less than the predetermined value Q, and thus the CTUs C2-C5 are combined into a second picture block M1. With this analogy, the CTUs C0-C17 in the picture P can be combined into multiple picture blocks.

With continued reference to FIG. 2, in operation S230, a target bit of at least one first CTU in the video is determined according to an actual bit of at least one second CTU in the video and a target bit of at least one third CTU in the video, in which a coding of the at least one first CTU is not started, the at least one second CTU is coded completely, and the at least one third CTU is not completely coded.

As mentioned above, in the equation (12) (or the equation (6)), the $Coded_{Pic}$ is the number of coded actual bits (i.e., bit costs) in the video. Generally, $Coded_{Pic}$ is a sum of actual bits of coded CTUs in the video. On condition that wire delay exists in the hardware, certain CTUs are not completely coded, and thus actual bits of theses CTUs cannot be known. As a result, the number of coded bits $Coded_{Pic}$ cannot be updated promptly, and thus it is unable to determine a target bit of the CTU which has not started being coded. Under this condition, higher hardware specifications are required or more processing time for coding the video is required.

Figure 4:
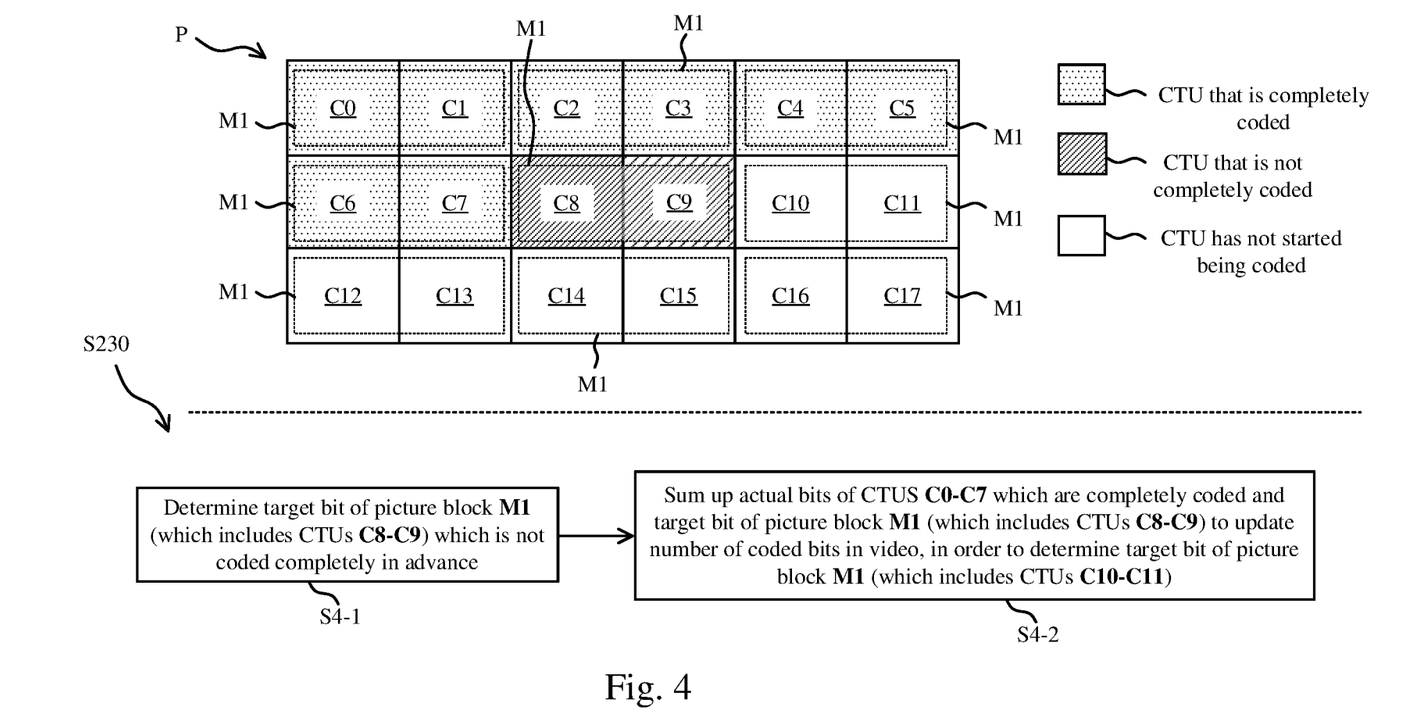
FIG. 4 is a schematic diagram of an operation in FIG. 2 according to some embodiments of the present disclosure.

In order to understand operation S230, reference is made to FIG. 4. FIG. 4 is a schematic diagram of operation S230 in FIG. 2 according to some embodiments of the present disclosure. As shown in FIG. 4, the CTUs C0-C7 are completely coded. The CTUs C8-C9 are currently coded but not completely coded (i.e. the actual bits of the coded CTUs C8-C9 are unknown). The coding of the CTU C10-C17 is not started. In this example, when determining the target bit $T_{mCTU}$ of the picture block M1 that includes the CTUs C10 and C11, the number of coded bits $Coded_{Pic}$ in the equation (12) can be estimated according to actual bits $T_{actual(C0-C7)}$ of the CTUs C0-C7 that are coded completely and the target bits $T_{mCTU(C8, C9)}$ of the CTUs C8-C9 that are not coded completely. For example, the number of the coded actual bits $Coded_{Pic}$ can be expressed as:

$$Coded_{Pic} = T_{actual(C0-C7)} + T_{mCTU(C8,C9)} \quad (13)$$

In the equation (3), the target bit $T_{mCTU(C8, C9)}$ of the picture block M1 (which includes the CTUs C8 and C9) that is not completely coded can be determined by using the equation (12) in advance (i.e., step S4-1). By utilizing the estimated target bit to replace the actual bits of the CTUs that are not completely coded, it is able to instantly update (or predict) the number of the coded bits in video (i.e., the value of $Coded_{Pic}$), in order to determine the target bit of the picture block M1 that has not started being coded (i.e., step S4-2). As a result, impacts from the wire (or pipeline) delay can be reduced.

With continued reference to FIG. 2, in operation S240, the coding parameters for coding video are sequentially adjusted according to target bit(s) (and/or actual bit(s)) of CTUs. Operation S240 can be understood with reference to operations S120 and S130 in FIG. 1 and steps S3-10, S3-12, and S3-14 in FIG. 3B, and thus repetitious descriptions are not further given.

The above description of the bit rate control method 200 includes exemplary operations, but the operations of the bit rate control method 200 are not necessarily performed in the order described above. Operations of the bit rate control method 200 can be added, replaced, changed order, and/or eliminated, or the operations of the bit rate control method 200 can be executed simultaneously or partially simultaneously as appropriate, in accordance with the spirit and scope of various embodiments of the present disclosure.

Figure 5:
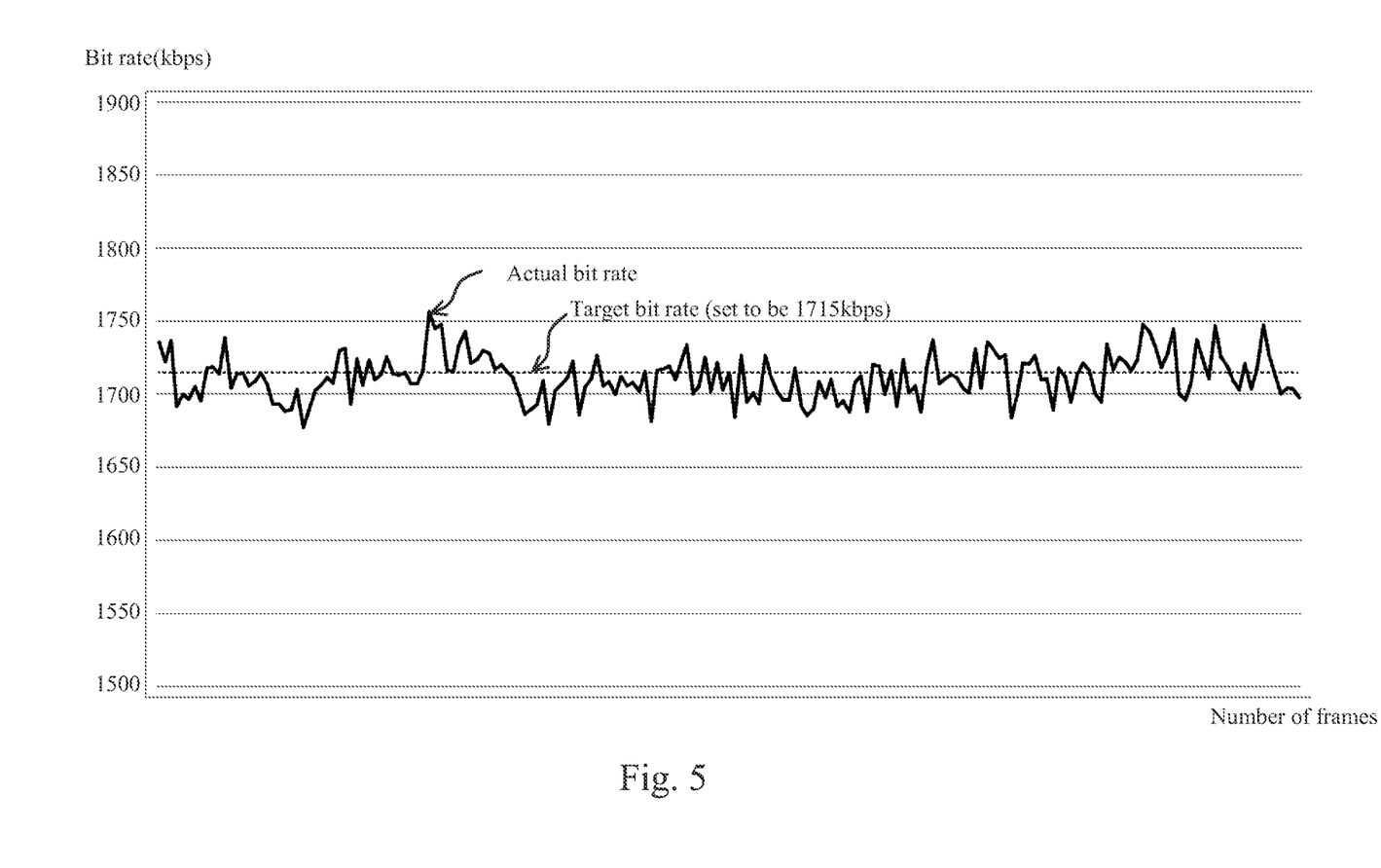
FIG. 5 is a schematic diagram showing an experimental result of the bit rate control according to some embodiments of the present disclosure.

FIG. 5 is a schematic diagram showing an experimental result of the bit rate control according to some embodiments of the present disclosure. In one experimental example, on a condition that the target bit rate is set to be 1715 kps and the frame rate is set to be 60 FPS, by performing the bit rate control method 200, the actual bit rate of the coded pictures in each frame is stable to be allocated in a range around the target bit rate. In other words, the bit rate control method 200 is able to achieve the bit rate control of the video with lower hardware requirements.

Figure 6:
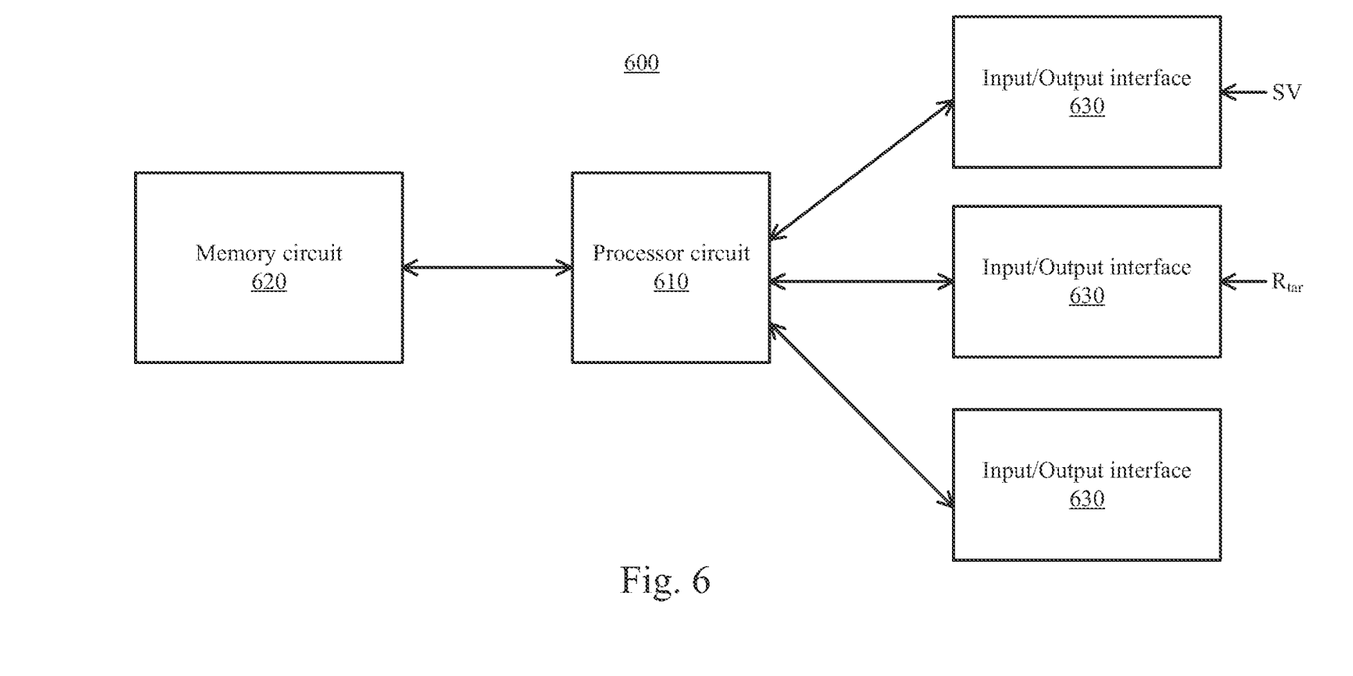
FIG. 6 is a schematic diagram of a video processing device according to some embodiments of the present disclosure.

FIG. 6 is a schematic diagram of a video processing device 600 according to some embodiments of the present disclosure. In some embodiments, the video processing device 600 may be an image processor device, such as a video processor chip, a video encoder circuitry, and a video card, and may perform the bit rate control method 100 in FIG. 1 and/or the bit rate control method 200 in FIG. 2.

The video processing device 600 includes a processor circuit 610, a memory circuit 620, and one or more input/output (I/O) interfaces 630. The processor circuit 610 is coupled to the memory circuit 620 and the I/O interfaces 630. In various embodiments, the processor circuit 610 may be a central processor unit (CPU), an application-specific integrated circuit (ASIC), a multi-processor, a pipeline processor, a distributed processing system, and/or a picture processor circuit. Various circuits or units to implement the processor circuit 610 are within the contemplated scope of the present disclosure. In some embodiments, the processor circuit 610 may operate as one or more video coders, and may analyze the video SV to acquire multiple parameters or values of the R-λ model, in order to control the bit rate of the video SV.

In some embodiments, the memory circuit 620 may operate as a data buffer, in order to temporarily store various data generated in the course when the processor circuit 610 executes the bit rate control method 200. In some embodiments, the memory circuit 620 stores one or more program codes which are for coding the video SV. For example, the program codes may be encoded with multiple instruction sets that are for coding the video SV and for controlling the bit rate of the coded video SV. The processor circuit 610 may execute the program codes store in the memory circuit 620, in order to perform operations for controlling the bit rate of the video SV (e.g., operations in FIG. 2).

In some embodiments, the memory circuit 620 may be a non-transitory computer readable storage medium that is configured to store multiple instruction sets for control the bit rate of the video SV. For example, the memory circuit 620 stores multiple executable instructions for performing operations in FIG. 2. In some embodiments, the computer readable medium may be an electronic, magnetic, optical, electromagnetic, infrared, and/or a semiconductor device. For example, the computer readable storage medium includes a semiconductor or solid-state memory, a magnetic tape, a removable computer diskette, a random-access memory (RAM), a read-only memory (ROM), a rigid magnetic disk, and/or an optical disk. In one or more embodiments using optical disks, the computer readable storage medium includes a compact disk-read only memory (CD-ROM), a compact disk-read/write (CD-RW), and/or a digital video disc (DVD).

The I/O interfaces 630 receive inputs or commands from various control devices, which, for example, are operated by a user. Accordingly, the processor circuit 610 is able to be manipulated with the inputs or commands received by the/O interfaces 630. For example, the user is able to input information about the target bit $R_{tar}$ of the video SV via the I/O interfaces 630, in order to provide information to the processor circuit 610 for performing the bit rate control method 200. In some embodiments, the I/O interfaces 630 are able to receive the video SV, and to transmit the same to the processor circuit 610 for subsequent processing.

In some embodiments, the I/O interfaces 630 include a display configured to display the coded content of the video SV. In some embodiments, the I/O interfaces 630 include a graphical user interface (GUI). In some embodiments, the I/O interfaces 630 include a keyboard, keypad, mouse, trackball, track-pad, touch screen, cursor direction keys, or the combination thereof, for communicating information and commands to processor circuit 610.

As described above, the bit rate control method and the video processing device provided in some embodiments of the present disclosure are able to determine a target bit for multiple CTUs, and to utilize the target bit to estimate the coded actual bits, in order to reduce the hardware complexity. Such bit rate control mechanism is in favor of lowering the hardware specification, and thus provides the ease of hardware implementation.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely some embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A bit rate control method, comprising:
   receiving a first target bit of a video to be coded;
   combining a plurality of first coding tree units in a plurality of coding tree units of the video into a picture block, and calculating a target bit of the picture block according to the first target bit and a weight of each of the plurality of first coding tree units to determine a second target bit of each of the plurality of first coding tree units;
   determining a fourth target bit of at least one fourth coding tree unit in the plurality of coding tree units according to an actual bit of at least one second coding tree unit in the plurality of coding tree units and a third target bit of at least one third coding tree unit in the plurality of coding tree units, wherein the at least one second coding tree unit is completely coded, the at least one third coding tree unit is not completely coded, and a coding of the at least one fourth coding tree unit is not started; and
   sequentially adjusting at least one coding parameter for coding the video according to the second target bit, the third target bit, and the fourth target bit.

2. The bit rate control method of claim 1, wherein the target bit of the picture block is the second target bit of each of the plurality of first coding tree units.

3. The bit rate control method of claim 1, wherein calculating the target bit of the picture block according to the first target bit and the weight of each of the plurality of first coding tree units comprises:
   summing the weight of each of the plurality of first coding tree units, in order to determine a weight corresponding to the picture block; and
   determining the target bit of the picture block according to the first target bit and the weight corresponding to the picture block.

4. The bit rate control method of claim 1, wherein combining the plurality of first coding tree units into the picture block comprises:
   determining a sum of absolute differences between the plurality of first coding tree units; and
   if the sum of absolute differences is less than a predetermined value, combining the plurality of first coding tree units into the picture block.

5. The bit rate control method of claim 1, wherein a number of the plurality of first coding tree units in the picture block is variable.

6. The bit rate control method of claim 1, wherein determining the fourth target bit comprises:
   determining the third target bit of the at least one third coding tree unit;
   summing the actual bit and the third target bit, in order to update a number of coded bits in the video; and
   determining the fourth target bit according to the updated number of coded bits.

7. The bit rate control method of claim 1, wherein the at least one coding parameter is a parameter in an R-$\lambda$ model.

8. A video processing device, comprising:
   a memory circuit configured to store at least one program code; and
   a processor circuit configured to execute the at least one program code, in order to:
      receive a first target bit of a video to be coded;
      combine a plurality of first coding tree units in a plurality of coding tree units of the video into a picture block, and calculate a target bit of the picture block according to the first target bit and a weight of each of the plurality of the first coding tree units to determine a second target bit of each of the plurality of first coding trees;
      determine a fourth target bit of at least one fourth coding tree unit in the plurality of coding tree units according to an actual bit of at least one second coding tree unit in the plurality of coding tree units and a third target bit of at least one third coding tree unit in the plurality of coding tree units, wherein the at least one second coding tree unit is completely coded, the at least one third coding tree unit is not completely coded, and a coding of the at least one fourth coding tree unit is not started; and
      sequentially adjust at least one coding parameter for coding the video according to the second target bit, the third target bit, and the fourth target bit.

9. The video processing device of claim 8, wherein the target bit of the picture block is the second target bit of each of the plurality of first coding tree units.

10. The video processing device of claim 8, wherein the processor circuit is configured to determine a sum of absolute differences between the plurality of first coding tree units, and if the sum of absolute differences is less than a predetermined value, the processor circuit is further configured to combine the plurality of first coding tree units into the picture block.

11. The video processing device of claim 8, wherein the processor circuit is configured to determine the third target bit of the at least one third coding tree unit, and to sum the actual bit and the third target bit, in order to update a number of coded bits in the video, and the processor circuit is further configured to determine the fourth target bit according to the updated number of coded bits.

12. The video processing device of claim 8, wherein the processor circuit is configured to sum the weight of each of the plurality of first coding tree units, in order to determine a weight corresponding to the picture block, and to determine the target bit of the picture block according to the first target bit and the weight corresponding to the picture block.

13. The video processing device of claim 8, wherein a number of the plurality of first coding tree units in the picture block is variable.

14. The video processing device of claim 8, wherein the at least one coding parameter is a parameter in an R-$\lambda$ model.

* * * * *